Figure 1:
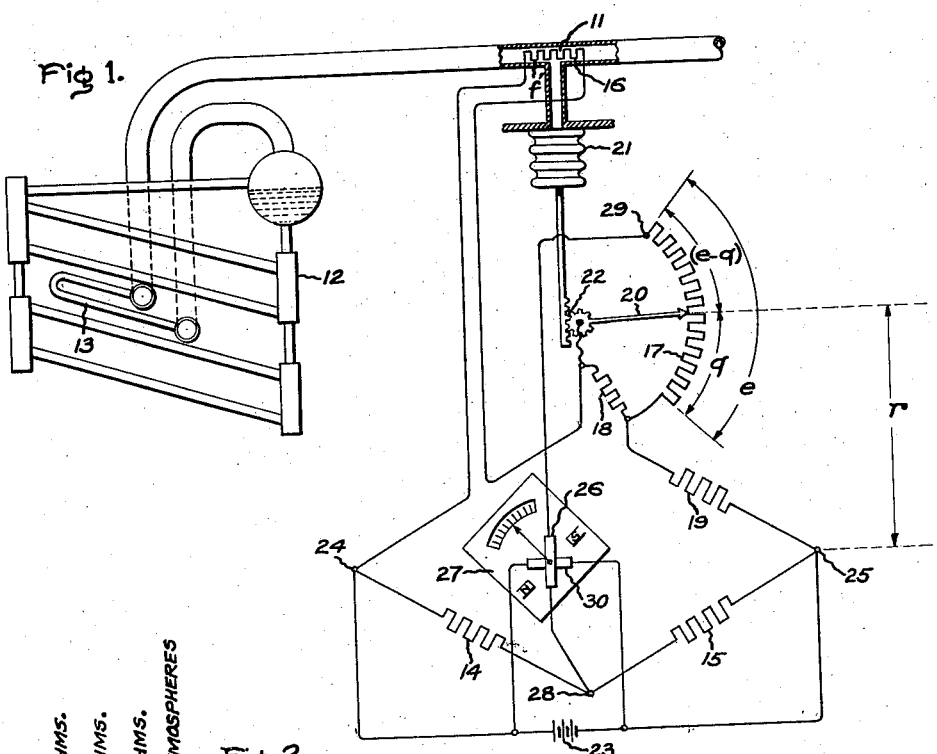

Aug. 31, 1937.   H. R. EGGERS   2,091,848
MEASURING INSTRUMENT
Filed Nov. 8, 1935

Inventor:
Hermann R. Eggers,
by Harry E. Dunham
His Attorney.

Patented Aug. 31, 1937

2,091,848

UNITED STATES PATENT OFFICE 2,091,848

MEASURING INSTRUMENT

Hermann R. Eggers, Berlin, Germany, assignor to General Electric Company, a corporation of New York Application November 8, 1935, Serial No. 48,912
In Germany December 18, 1934

9 Claims. (Cl. 73—32)

My invention relates to measuring instruments and concerns particularly devices responsive to the degree of superheat of steam and other vapors or gases.

When saturated steam is conveyed in pipes for any considerable distance, the steam is liable to condense in the pipes. In order to avoid condensation when sending steam through long lengths of piping and also for other purposes, steam is frequently superheated. When the steam pressure is constant, the temperature of the steam indicates the degree of superheat. This is not the case, however, when the steam pressure varies. If the pressure increases while the temperature remains the same, the superheating becomes less, and vice versa. It is, therefore, difficult in variable pressure installations to obtain a conception of the degree of superheat simply from thermometer readings.

In accordance with my invention, I provide both temperature and pressure responsive elements and cause their action to be combined with a steam chart in such a way that the degree of superheat may readily be perceived. The steam chart may either be actually drawn out as a suitable system of curves appearing under a pair of pointers, responsive respectively to temperature and pressure, so as to permit directly reading the superheat, or parts of the indicating apparatus may be arranged to act in accordance with the relationships expressed by a steam chart.

In carrying out my invention in its preferred form, the relationships of the steam chart are produced by the properties of electric circuit elements, and pressure and temperature are combined electrically to provide a direct indication of superheat by a single movable member, such as a pointer or recording pen. A Wheatstone bridge is provided with means for varying the resistance of one arm in response to variations in temperature of the steam, means for varying the resistance in another arm in accordance with the pressure of the steam, and a bridge galvanometer responding to the relationship of the resistances in the variable resistance arms. It will be evident that the galvanometer must read zero when the steam is saturated regardless of pressure, and that, at any given degree of superheat, the reading must remain constant regardless of pressure variations.

The invention will be understood more readily from the following detailed description taken in connection with the accompanying drawing, and those features of the invention which are believed to be novel and patentable will be pointed out in the claims appended hereto. In the drawing Fig. 1 is a schematic diagram of one form of my invention representing the electric circuit, and Fig. 2 is a set of graphs explaining the theory of operation of the apparatus.

Figure 2:
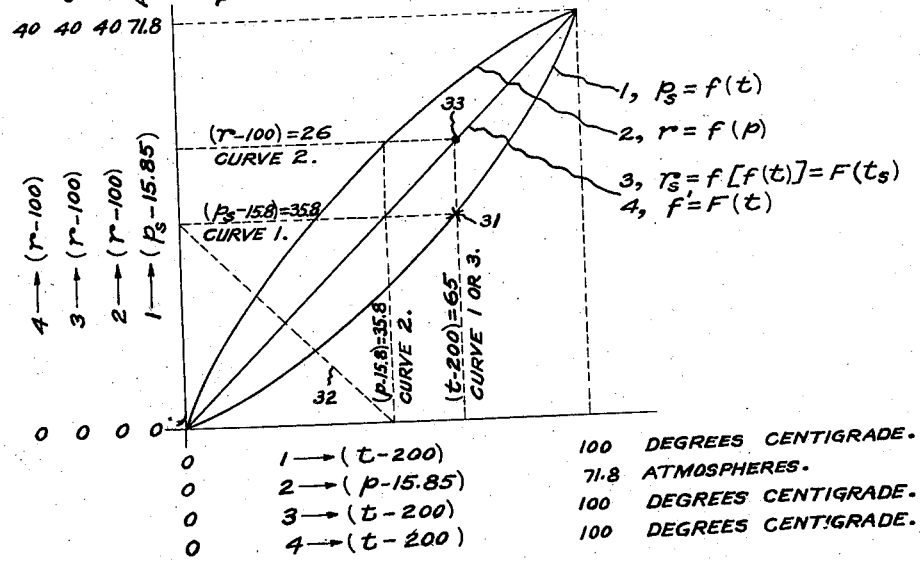

Fig. 1 illustrates an arrangement for measuring the superheat of steam at a point 11 in a pipe through which steam issues from a boiler 12 having superheating coils 13. There is a Wheatstone bridge made up of a plurality of resistors. Two of the bridge arms are formed by resistors 14 and 15, having substantially constant resistance. A third bridge arm includes a resistor which is caused to vary in resistance in accordance with variations in steam temperature. For example, the third arm may be formed by a resistor 16 which is kept at the temperature of the steam. The resistor 16 is kept at the temperature of the steam in any suitable manner as by providing a jacket with a steam passage in intimate thermal contact with the resistor 16, or by placing the resistor 16 directly within the pipe 11. A fourth bridge arm is made up of several resistors, represented collectively by the symbol $r$. The bridge arm $r$ consists of a portion $q$ of a rheostat 17, a resistor 18 in parallel with the portion $q$ of the rheostat 17, and a resistor 19 in series with the parallel pair of resistances $q$ and 18. The rheostat 17 is provided with a sliding contact 20, which is connected to one end of the resistor 18 and serves as one terminal of the bridge. The contact 20 is arranged to slide over the rheostat 17 in accordance with variation in pressure of the steam at 11. For example, a pressure-responsive element, such as a Bourdon tube or an expanding diaphragm or a bellows 21, is provided with a suitable gearing, such as a rack and pinion 22, for rotating the contact 20 in response to variations in steam pressure.

A source of current 23 is connected between the opposite terminals 24 and 25 of the bridge to energize the bridge. In a diagonal or cross circuit between the remaining two opposite terminals of the bridge is connected a current-conducting coil 26 of a galvanometer 27. The galvanometer coil 26 is connected to a bridge terminal 28 and a free end 29 of the rheostat 17 so that the galvanometer circuit includes the portion $(e-q)$ of the rheostat 17, the symbol $e$ being used to signify the entire resistance of the rheostat 17. If desired, the galvanometer 27 may be provided with a voltage-compensating coil 30 connected across the current source 23 in order to compensate for variations in voltage of the source in the manner of an ohmmeter, or ratio indicator.

The constants of the resistors constituting the arm $r$ are so chosen that, within the range of operation for which the apparatus is designed, variations in the resistance $r$ produced by variations in pressure are substantially proportional to the corresponding variations in temperature of saturated steam. Furthermore, as will be explained hereinafter, the rheostat 17 is so designed that the variable portion ($e$—$q$) in the galvanometer circuit corrects for variations in bridge current resulting from the fact that the resistances of both arms 16 and $r$ vary as the steam temperature and pressure vary for a given degree of superheat under variable steam pressure conditions.

In Fig. 2, curve 1, plotted from steam tables, represents a saturated steam pressure-temperature chart showing the variations in the pressure $p_s$ of saturated steam at various temperatures $t$ between 200 and 300 degrees centigrade, which is assumed, for the sake of illustration, to be the working range of the apparatus. Between these temperatures, the pressure is found to vary from 15.85 atmospheres to 87.6 atmospheres absolute. For convenience, the graph is drawn with the axes of coordinates intersecting at the point representing 200 degrees centigrade and 15.85 atmospheres, so that the variables plotted are actually ($p_s$—15.85) and ($t$—200). It will be observed that curve 1 is a sagging curve. The curve 1 may be represented symbolically by the equation $p_s = f(t)$, indicating that $p_s$ varies as a function of $t$.

For the sake of explaining the operation of the apparatus, an example will be given with certain numerical values assumed, although, of course, any desired circuit constants consistent with the principle of the invention may be employed. The bridge arm 16 is assumed to be so designed that its resistance in ohms, represented by the symbol $f'$, is given by the equation $$f' = 100[1 + 0.004(t - 200)]$$

That is, the resistance $f$ varies linearly from 100 ohms to 140 ohms between the temperatures of 200 and 300 centigrade.

It is also assumed that the resistance steps of the rheostat 17 and the pressure-responsive mechanism 21—22 are so arranged that the resistance $q$ satisfies the equation $$q = 1.062(p - 15.85)$$

It is further assumed that the resistor 18 has a resistance of 84 ohms and the resistor 19 has a resistance of 100 ohms. Then, $$r = 100 + \frac{1}{\frac{1}{84} + \frac{1}{q}} = 100 + \frac{1}{\frac{1}{84} + \frac{1}{1.062(p-15.85)}}$$

$$(r - 100) = \frac{1}{\frac{1}{84} + \frac{1}{1.062(p-15.85)}}$$

This equation is plotted as curve 2 of Fig. 2.

The curve 2 of Fig. 2 may be represented by the equation $r = f(p)$, indicating that the resistance of the bridge arm $r$ varies as a function of the steam pressure. It will be seen that the curve 2 tends to bulge upward and the resistance $r$ varies from 100 to 140 between the pressures 15.85 and 87.6.

If the values of $p$ found from curve 1 are substituted in the equation of curve 2, $r = f(p_s)$, a new equation will be obtained, $r = f[f(t)]$ or $r = F(t_s)$, indicating that $r$ is also some function of the temperature of saturated steam. The curve 3 representing the equation $r = F(t_s)$ may then be plotted. For example, following the dotted lines in Fig. 2 at the point 31, when ($t$—200)=65, ($p$—15.85)=35.8. Carrying this value from the ordinate of curve 1 to the abscissa of curve 2 along the dotted line 32, a value of ($r$—100)=26 is found from curve 2. The point 33 may then be plotted at the intersection of the coordinates ($t$—200)=65 and ($r$—100)=26. The complete curve 3 may be plotted in a similar way by locating additional points, and it will be found, owing to the fact that the curve 1 sags downward and the curve 2 bulges upward, that the curve 4 will be substantially linear with $r$ varying from 100 ohms to 140 ohms between temperatures of 200 and 300 centigrade. However, $f'$, the resistance of the bridge arm 16, also varies linearly through the same points, and a curve 4, $f' = F(t)$, which might be drawn would coincide with curve 3, $r = F(t_s)$.

It is assumed also that resistances 14 and 15 are made equal although they may have any desired ratio if the resistances of the other parts of the bridge are suitably chosen. Since curves 3 and 4 coincide, indicating that the bridge arms $f'$ and $r$ have equal resistance at any pressure of saturated steam, the bridge will remain balanced and the galvanometer will correctly indicate zero degrees of superheat regardless of steam pressure when the steam is saturated.

When the steam is superheated, the temperature and resistance of the bridge arm $f'$ will be raised although the steam pressure and the resistance of the arm $r$ may remain unchanged. Consequently, current will flow in the galvanometer 27 and a reading of superheat will be given. However, if the superheat remains constant as the pressure varies, the ratio between the resistances of arms $f'$ and $r$ will tend to vary owing to the fact that, for any steam pressure, the resistance of the arm $f'$ remains a fixed amount higher than the resistance of the arm $r$, or higher than the resistance which $f'$ would have at the pressure in question if the steam were saturated. The reading of the galvanometer would, therefore, tend to vary were it not for the fact that the galvanometer current is augmented as the steam pressure rises by the decrease in resistance of the galvanometer circuit resulting from the fact that the resistance of the portion ($e$—$q$) of the rheostat 17 becomes smaller as the portion $q$ becomes larger with increasing pressure. It will be understood that the resistance of the remainder of the galvanometer circuit must be so chosen in relation to the resistance of the steps of the rheostat 17 that the proper compensation is obtained and the galvanometer reading remains constant at a predetermined value of superheat regardless of the steam pressure. If the galvanometer coil 26 is connected to the contact 20 instead of the terminal 29, the apparatus may still be used to indicate whether or not the steam is superheated although it will not give such accurate readings of the degree of superheat.

It has been assumed in the foregoing that the temperature coefficient of resistance of the bridge arm 16 is a constant at different temperatures, which is very nearly true. However, if greater refinement is desired, any change with temperature in the temperature coefficient of resistance may be taken into account by a suitable modification in the arrangement of the resistors.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:—

1. A steam-superheat responsive apparatus comprising in combination, a device responsive to pressure of steam to be measured, a plurality of resistors forming the four arms of a Wheatstone bridge, a source of current connected across two opposite points of said bridge, and a current-responsive device connected across the remaining two opposite points of said bridge, two adjacent arms of said bridge being variable in resistance, one of said variable resistance arms including a resistor of temperature-responsive variable-resistance material in thermal relation with steam to be measured, and the other of said variable resistance arms including a rheostat actuated by said pressure-responsive device and said rheostat including means for maintaining the resistance ratio of said variable resistance arms constant under temperature and pressure conditions corresponding to temperature and pressure of saturated steam.

2. A steam-superheat indicator comprising in combination, a Wheatstone bridge including four resistance arms in series-parallel, means for varying the resistance of one of said arms in response to variations in steam temperature, means for varying the resistance in an arm adjacent said temperature-responsive arm in response to variations in steam pressure, a current-responsive device connected to said Wheatstone bridge between the common point of one pair of series bridge arms and the common point of the other pair of series bridge arms, and means for energizing said bridge, one of said variable resistance arms having means for maintaining their resistance ratio constant under temperature and pressure conditions corresponding to temperature and pressure of saturated steam.

3. A steam-superheat responsive apparatus comprising in combination, a source of current, a pair of resistors connected in series to said current source, means for varying the resistance of one of said resistors in response to variations in steam temperature, means for varying the resistance of another of said resistors in response to variations in steam pressure, and means responsive to variation in the relative voltage drop distribution in said resistors, said resistors having a constant resistance ratio under temperature and pressure conditions corresponding to the temperature and pressure of saturated steam.

4. A steam-superheat responsive apparatus comprising in combination, a device responsive to steam pressure, a source of current, a Wheatstone bridge including four impedance arms connected to said current source in series-parallel, and a current-responsive device connected in cross circuit between said bridge arms, one of said bridge arms being variable in impedance and having impedance-adjusting means controlled by said pressure-responsive device, another of said bridge arms being variable in impedance in response to steam temperature, and one of the latter two arms having means for maintaining their impedance ratio constant under temperature and pressure conditions corresponding to the temperature and pressure of saturated steam.

5. A steam-superheat responsive apparatus comprising in combination, a source of current, a Wheatstone bridge including four impedance arms connected to said current source in series-parallel, a current-responsive device and an impedance connected in cross circuit between said bridge arms, means for varying the impedance of one of said bridge arms in response to variations in steam temperature, and means for varying the impedance of another of said bridge arms and said cross-circuit impedance in response to variations in steam pressure.

6. A steam-superheat responsive apparatus comprising in combination, a source of current, a Wheatstone bridge including four impedance arms connected to said current source in series-parallel, a current-responsive device and an impedance member connected in cross circuit between said bridge arms, means for varying the impedance of one of said bridge arms in response to variations in steam temperature, means for varying the impedaance of another of said bridge arms in response to variations in steam pressure, and means for varying the impedance of said cross-circuit impedance member, the cross-circuit impedance being increased as the pressure-responsive impedance is decreased, and vice versa.

7. A steam-superheat responsive apparatus comprising in combination, a source of current, a Wheatstone bridge including four impedance arms connected in series-parallel to said current source, a current-responsive device connected in cross circuit between said bridge arms, means for varying the impedance of one of said bridge arms substantially in proportion to variations in steam temperature, and means for varying the impedance of a bridge arm adjacent thereto in response to variations in steam pressure substantially in proportion to variations in temperature of saturated steam with pressure.

8. A Wheatstone bridge arrangement responsive to steam conditions comprising in combination, a source of current, impedances connected in series parallel to said current source, a current responsive device connected in cross circuit between said bridge arms so as to be responsive to unbalance thereof, means for varying the impedances of two adjacent arms of said bridge in response to variations in temperature and pressure respectively of steam and in such proportion as to keep the bridge balanced while the steam is saturated.

9. A Wheatstone bridge arrangement responsive to steam conditions comprising in combination, a source of current, impedances connected in series-parallel to said current source, a current-responsive device connected in cross circuit between said bridge arms so as to be responsive to unbalance thereof, and means for varying the impedances of two of said bridge arms in response to variations in temperature and pressure, respectively, of steam, and in such proportion and direction as to keep the bridge balanced while the steam is saturated.

HERMANN R. EGGERS.